United States Patent
Yoshida et al.

(10) Patent No.: US 7,298,706 B2
(45) Date of Patent: Nov. 20, 2007

(54) METHOD AND APPARATUS FOR POWER LINE COMMUNICATION

(75) Inventors: Shigeo Yoshida, Osaka (JP); Shinichiro Ohmi, Osaka (JP); Tohru Yasukawa, Wakayama (JP); Tsuyoshi Yamaguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 101 days.

(21) Appl. No.: 10/573,774

(22) PCT Filed: Aug. 19, 2005

(86) PCT No.: PCT/JP2005/015499
§ 371 (c)(1),
(2), (4) Date: Mar. 28, 2006

(87) PCT Pub. No.: WO2006/022363
PCT Pub. Date: Mar. 2, 2006

(65) Prior Publication Data
US 2007/0025262 A1 Feb. 1, 2007

(30) Foreign Application Priority Data
Aug. 24, 2004 (JP) ............................. 2004-243920

(51) Int. Cl.
*G01R 31/08* (2006.01)

(52) U.S. Cl. ...................................... 370/252; 370/503
(58) Field of Classification Search .................... None
See application file for complete search history.

(56) References Cited

U.S. PATENT DOCUMENTS

| 6,765,889 B1 * | 7/2004 | Ludwig ....................... 370/331 |
| 2003/0016123 A1 | 1/2003 | Tager et al. |
| 2004/0070912 A1 | 4/2004 | Kopp |
| 2005/0096031 A1 * | 5/2005 | Sugaya et al. ........... 455/422.1 |

FOREIGN PATENT DOCUMENTS

JP 2002-158675 5/2002

* cited by examiner

Primary Examiner—Duc Ho
(74) Attorney, Agent, or Firm—Wenderoth, Lind & Ponack, L.L.P.

(57) ABSTRACT

The variation cycle L of the characteristics of a transmission line is divided into a plurality of sections (n sections), a procedure is repeated in which transmission line estimation is performed for only one section among n sections in one beacon period, and thus transmission line estimation is performed for all of the n sections. The beacon period T is set based on (T=L×m/n), where n is an integer that is 2 or larger, and m is an integer that is n or larger and whose greatest common measure with n is 1.

13 Claims, 10 Drawing Sheets

| TONEMAP NUMBER | SUBCARRIER NUMBER | INFORMATION ON USE OF SUBCARRIER/ MODULATION FACTOR |
|---|---|---|
| 1 | 1 | NOT IN USE |
| | 2 | 4 |
| | 3 | 6 |
| | ... | ... |
| | N | 5 |

METHOD AND APPARATUS FOR POWER LINE COMMUNICATION

TECHNICAL FIELD

The present invention relates to a communication apparatus and a transmission line estimation method. More specifically, the present invention relates to a communication apparatus sending and receiving data based on the characteristics of a transmission line between apparatuses without lowering the throughput, and a transmission line estimation method (channel estimation) performed by the communication apparatus, by which the characteristics of the transmission line are estimated and evaluated with a high precision.

BACKGROUND ART

In a communication method by which communication parameters such as a subcarrier and a modulation method used for transmission and reception are determined based on estimation on the characteristics of a transmission line, it is important to precisely determine the communication parameters that are suitable for the characteristics of the transmission line in transmission. In particular, in a communication system having attenuation characteristics that deeply depend on the frequency (power line carrier communications having a power line as a communication medium, for example), it is effective to use a multi-carrier transmission line method using a subcarrier and a modulation method that are suitable for the characteristics of the transmission line In a transmission line estimation method used in conventional communication systems, a transmission line is estimated periodically or when the number of retransmissions due to communication errors exceeds a specified value (considering that the characteristics of the transmission line are deteriorated) Then, based on the result of this estimation on the transmission line, new parameters are selected, and data is sent or received. This technique has been disclosed in, for example, JP2002-158675A.

However, in an environment in which the characteristics of the transmission line vary periodically, the communication parameters selected when estimating the transmission line often do not suit for the characteristics of the transmission line when sending data if a timing of sending data is not synchronized with the periodical variation of the characteristics of the transmission line. Thus, in the above-described conventional method, the maximum communication efficiency is not always obtained even when the transmission line is estimated.

Thus, as a countermeasure for this problem, a following method has been conventionally proposed.

First, the variation cycle of the characteristics of a transmission line is synchronized with the frame period of a communication system, and this variation cycle is divided into a plurality of sections. Next, within one frame period, the plurality of divided sections of the transmission line are continuously estimated section by section. Then, as a result of the transmission line estimation, communication parameters obtained in a section with the highest communication efficiency are selected and then communications are performed. FIG. 12 is a process sequence of this conventional method for estimating a transmission line.

However, in the conventional method shown in FIG. 12, there is the problem that the transmission line is estimated continuously, and thus requests to estimate the transmission line and their response messages occupy the transmission line and disturb communications of stream data, audio data, or other data that is supposed to be sent. Furthermore, in this conventional method, a time from the starting point of the frame period of the communication system to the starting time of a transmission line estimation section is different for each frame period. As a result, when the band is guaranteed, for example, with time sharing, not only is scheduling for transmission line estimation complicated, but also arises a case in which a scheduling condition cannot be satisfied.

DISCLOSURE OF THE INVENTION

Therefore, an object of the present invention is to provide a communication apparatus in which a transmission line is estimated in a distributed manner by a simple scheduling, so that the characteristics of the transmission line are estimated and evaluated with a high precision and thus data can be sent and received at a high throughput without affecting other streams, and a transmission line estimation method performed by the communication apparatus.

The present invention is directed to a communication apparatus performing periodical communications with another communication apparatus via a transmission line. In order to achieve the above-described object, the communication apparatus of the present invention is provided with a communication control portion, a transmission line estimation portion, and a communication parameter determination portion.

The communication control portion sets the communication period to $(L \times m/n)$ (L is the variation cycle of the characteristics of a transmission line, n is an integer that is 2 or larger, and m is an integer that is n or larger and whose greatest common measure with n is 1) to perform communications. The transmission line estimation portion estimates the characteristics of the transmission line within a time $(L/n)$ after a certain offset time $(L \times k/n)$ (k is a real number that is 0 or larger) has passed since the communication period started. The communication parameter determination portion determines a communication parameter to be used by the communication control portion, based on a result of estimation by the transmission line estimation portion.

It is preferable that the transmission line estimation portion estimates the characteristics of the transmission line at least n times. Furthermore, the communication apparatus may estimate the characteristics of the transmission line at the initial starting up or upon detecting a change in a state of the transmission line. A typical communication period is the period of beacons sent from a communication apparatus serving as a base unit. When there is a request to estimate the characteristics of the transmission line, the communication apparatus sends a request to allocate a time for estimating the characteristics of the transmission line to the communication apparatus serving as the base unit, and the characteristics of the transmission line are estimated only when permission is given. This request may be notified using the beacon frame or the polling frame to another communication apparatus. A typical variation cycle L of the characteristics of the transmission line is the half cycle of the commercial power supply cycle.

Each of the processes performed by each of the components of the communication apparatus described above can be regarded as a transmission line estimation method that gives a series of procedures. This method is provided in the form of a program for letting a computer execute the series of procedures. This program may be introduced in a computer in the form stored in a computer-readable storage medium. Furthermore, a part of the functional blocks described above that constitute the communication apparatus may be realized as an LSI, which is an integrated circuit.

As described above, according to the present invention, a transmission line is estimated in a distributed manner by a simple scheduling, so that the characteristics of the transmission line are estimated and evaluated with a high precision and thus data can be sent and received at a high throughput without affecting other streams.

BEST MODE FOR CARRYING OUT THE INVENTION

Hereinafter, embodiments of the present invention will be described with reference to the drawings.

First Embodiment

Figure 1:
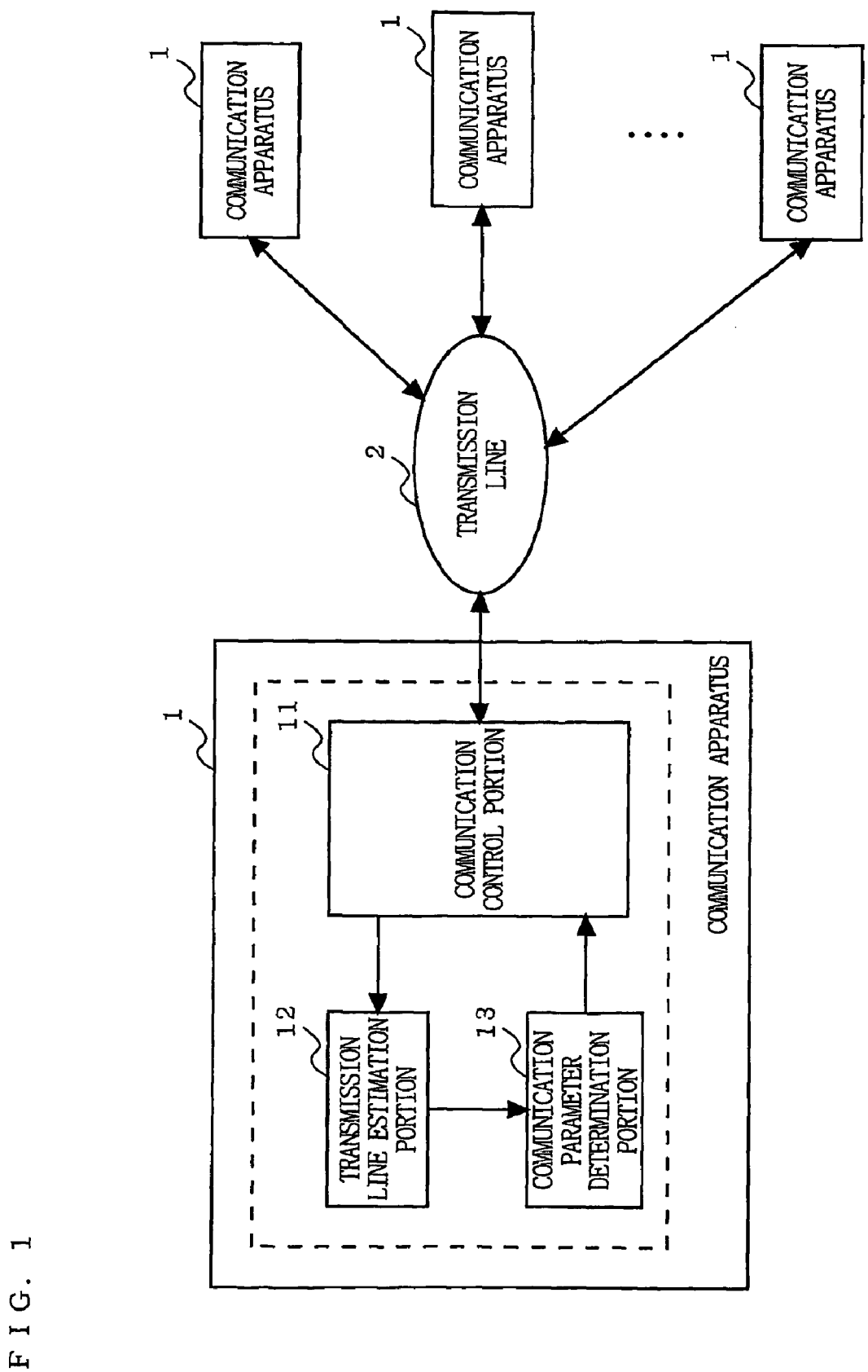
FIG. 1 is a diagram showing a configuration example of a communication network system using communication apparatuses according to a first embodiment of the present invention.

FIG. 1 is a diagram showing a configuration example of a communication network system using a communication apparatus 1 according to a first embodiment of the present invention. In FIG. 1 in the communication network system of the present invention, a plurality of communication apparatuses 1 are connected to each other via a transmission line 2. The transmission line 2 may be either wired or wireless. This embodiment will be described using, as an example, the communication network system in which one of the plurality of communication apparatuses 1 is a master unit, and this master unit periodically transmits a beacon so as to control the communications of the other communication apparatuses 1 (slave units).

The communication apparatus 1 is provided with a communication control portion 11, a transmission line estimation portion 12, and a communication parameter determination portion 13. The communication control portion 11 deals with most of the communication processes performed by the communication apparatus 1. Basically, this communication control portion 11 performs communications with another communication apparatus 1 using communication parameters determined by the communication parameter determination portion 13. The transmission line estimation portion 12 measures the characteristics of the transmission line 2 at predetermined periodical timings and estimates a state of the transmission line 2. The communication parameter determination portion 13 sets or updates communication parameters based on the result obtained when transmission line estimation portion 12 estimates the transmission line 2.

Figure 2:
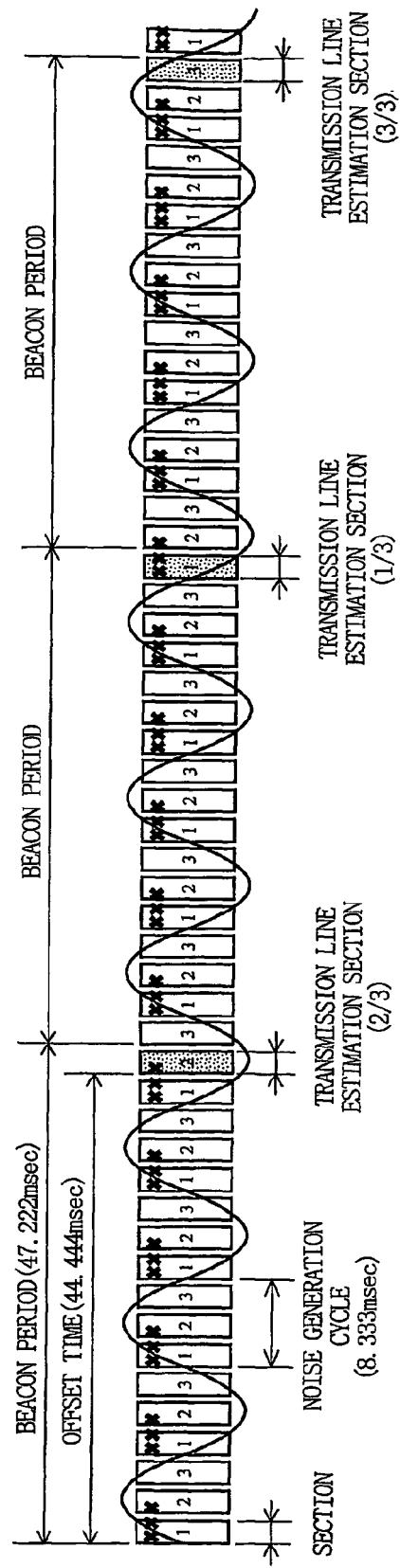
FIG. 2 is a diagram showing an example of timings at which a transmission line is estimated by the communication apparatuses according to the first embodiment of the present invention.
Figure 3:
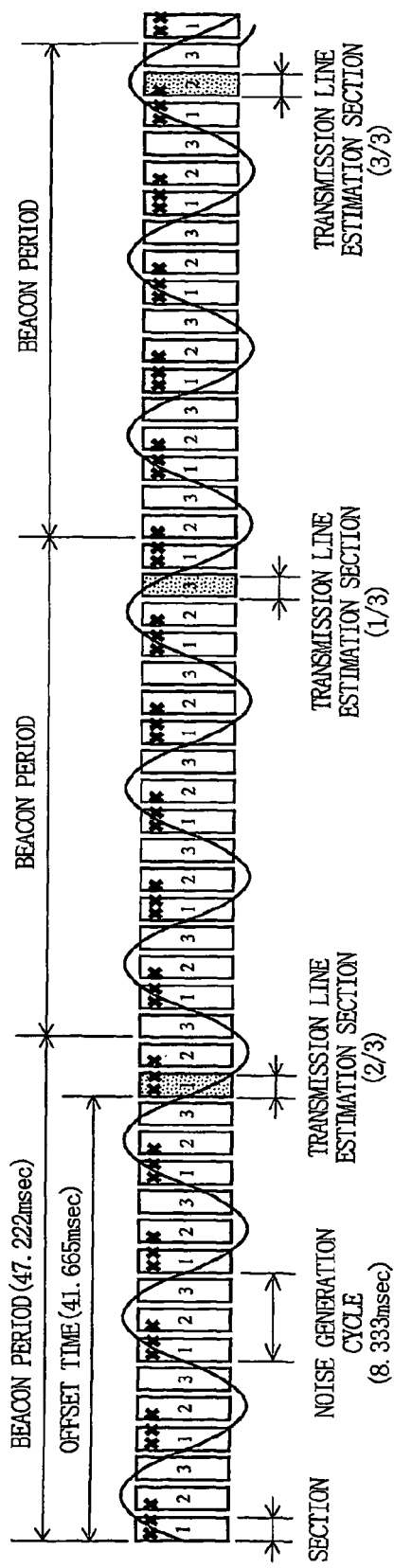
FIG. 3 is a diagram showing another example of timings at which a transmission line is estimated by the communication apparatuses according to the first embodiment of the present invention.
Figure 4:
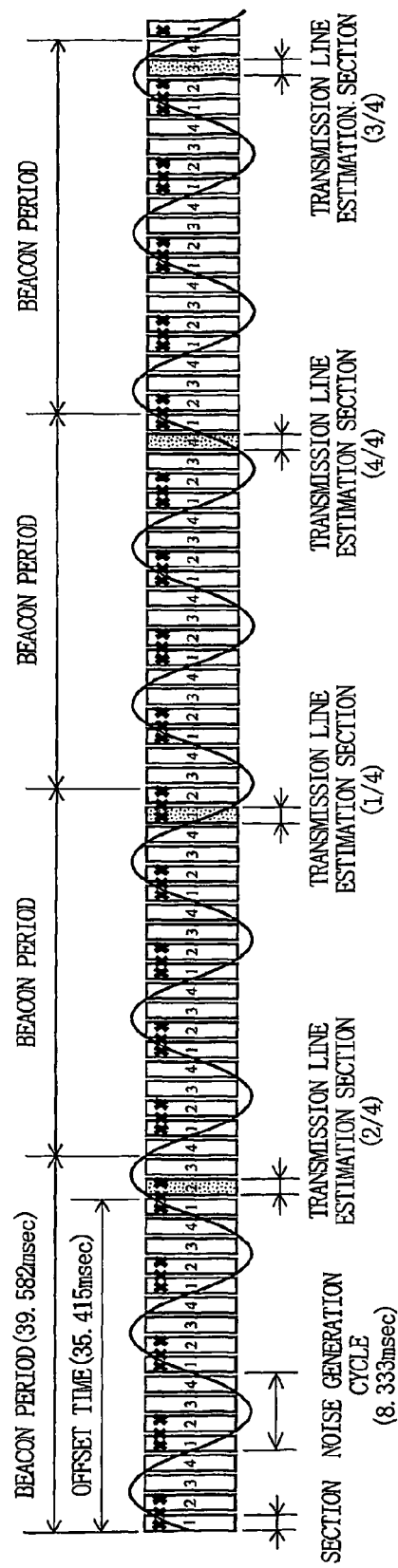
FIG. 4 is a diagram showing another example of timings at which a transmission line is estimated by the communication apparatuses according to the first embodiment of the present invention.
Figure 5:
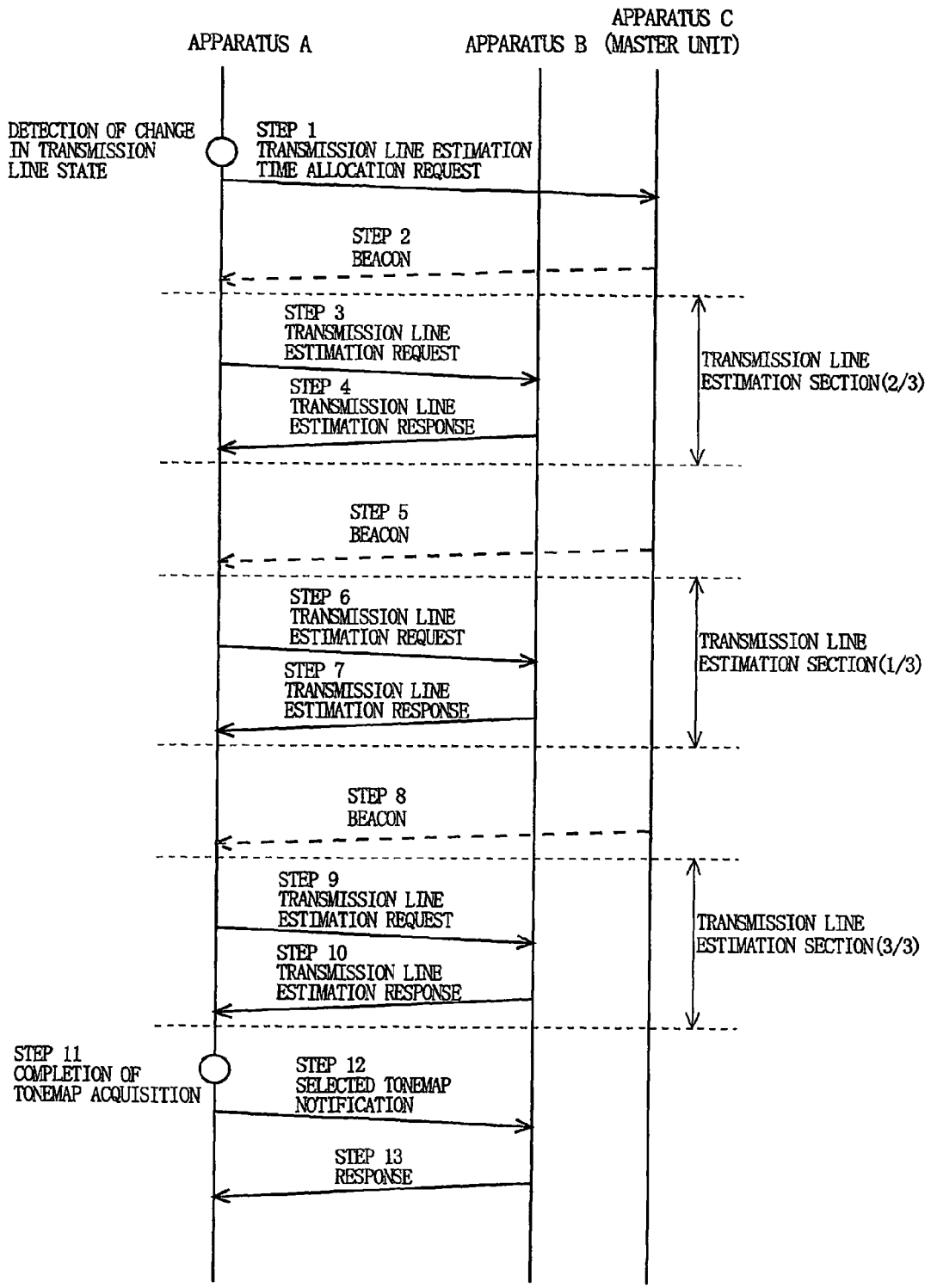
FIG. 5 is a communication sequence showing the procedure following which a transmission line is estimated by the communication apparatuses according to the first embodiment of the present invention.

Hereinafter, a method by which the thus configured communication apparatus 1 estimates the characteristics of a transmission line will be described. FIGS. 2 to 4 are diagrams each showing an example of timings at which a transmission line is estimated by the communication apparatus 1 according to the first embodiment of the present invention. FIG. 5 is a communication sequence showing the procedure following which a transmission line is estimated by the communication apparatus 1 according to the first embodiment of the present invention.

In this embodiment, a case will be described in which in the transmission line 2 in the communication network system, a noise with a certain pattern (the mark X in FIG. 2) is generated with certain intervals as shown in FIG. 2, that is, the variation cycle of the characteristics of the transmission line corresponds to these certain intervals. In this case, the communication control portion 11 in each of the communication apparatuses 1 that constitute the communication network system sets the beacon period, which will be the communication period, in the following manner. Herein, the beacon period refers to a time interval between when a beacon is transmitted by the master unit and when its next beacon is transmitted.

There is a case in which due to an influence of a power circuit of, for example, a household electrical appliance that is connected to a power line, the cycle of a noise pattern on the power line is the same as the half cycle of a commercial power supply (50 Hz or 60 Hz). Accordingly, when assuming a communication network system using a power line, it is necessary to consider the characteristics of a transmission line that has been synchronized with the half cycle of the commercial power supply described above (see sine waves in FIG. 2).

A point of the setting is that a variation cycle L of the characteristics of the transmission line is divided into n sets of sections (n sections), a procedure is repeated in which transmission line estimation is performed for only one section among n sections in one beacon period, and thus transmission line estimation is performed for all of the n sections. A beacon period T for realizing this point is set based on "T=L×m/n", where n is an integer that is 2 or larger, and m is an integer that is n or larger and whose greatest common measure with n is 1. Furthermore an offset time is set based on "L×k/n", where k is a real number that satisfies 0≦k<m. In this manner, when the offset time is set to enable a transmission line to be estimated within one beacon period and section by section, it is possible to deal with a variation of the transmission line quickly. It should be noted that the offset time can be set freely if dealing with a variation of the transmission line rapidly is not considered.

FIGS. 2 and 3 are examples in which n=3 and m=17. FIG. 4 is an example in which n=4 and m=19. When assuming a communication network system using a power line as described above, the beacon period T is calculated using L=8.333 msec when the commercial power supply frequency is 60 Hz and using L=10 msec when the commercial power supply frequency is 50 Hz. In FIGS. 2 to 4, a description of the beacon itself has been omitted. Furthermore, regarding the offset time, k=16 in FIG. 2, k=15 in FIG. 3, and k=17 in FIG. 4. As seen in FIGS. 2 to 4, when the beacon period and the offset time are set based on the above-described points, after the offset time has passed, each of the transmission line estimation sections does not have the same timing as that of the commercial power supply cycle and slides therefrom. Therefore, it is possible to easily realize the transmission line estimation that does not overlap the commercial power supply cycle and that is continuous in time.

Referring to FIG. 5, the procedure following which a transmission line is estimated by the communication apparatus 1 will be described in detail.

At the initial starting up such as when the power is turned on, or upon detecting a change in the characteristics of a transmission line, a communication apparatus 1 serving as a slave unit (hereinafter, referred to as apparatus A) requests a communication apparatus 1 serving as a master unit (hereinafter, referred to as apparatus c) to allocate a time for estimating the transmission line (step 1). When receiving the request to allocate a time for estimating the transmission line from the apparatus A, the apparatus C sends a beacon, to which information on time allocation for estimating the transmission line is added, during the next time of sending the beacon (step 2). This information on the time allocation for estimating the transmission line refers to information showing sections that can be used for estimating the transmission line, and is typically given as the offset time from the starting time of the beacon period.

When receiving the beacon, to which the information on time allocation for estimating the transmission line is added, from the apparatus c, the apparatus A measures the characteristics of the transmission line based on this information, after the offset time has passed since the beacon period started. In the example in FIG. 2, the characteristics of the transmission line are measured in a transmission line estimation section 2/3 (the half-tone portion 2 in the drawing). A specific method for measuring the characteristics of the transmission line is that the apparatus A sends a communication apparatus 1 serving as a slave unit of interest in the communications (hereinafter, referred to as apparatus B) a request to estimate the transmission line (step 3), and receives a response, from the apparatus B, for the request to estimate the transmission line (step 4). This estimation on the transmission line is, for example, performed in the following manner.

Figures 6, 7:
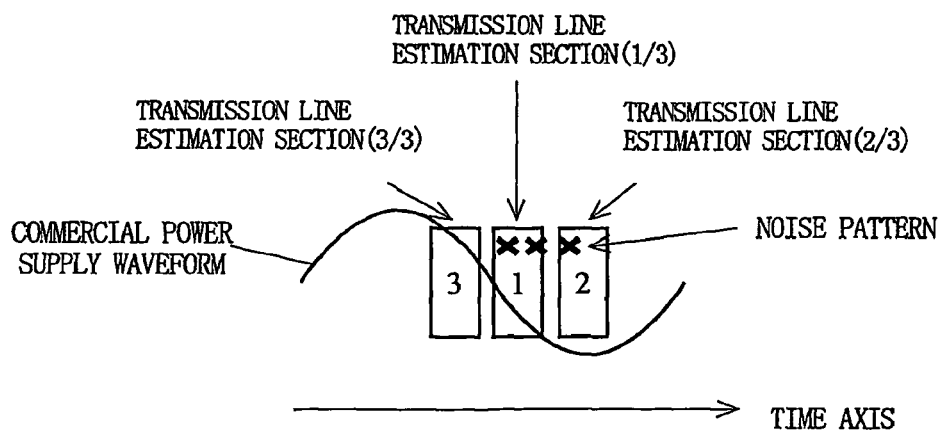
FIG. 6 is a diagram showing an example of a tonemap.
FIG. 7 is a diagram explaining the relationship between a noise and transmission line estimation sections.

First, a predetermined estimation series as well as the transmission line estimation request are sent from the apparatus A to the apparatus B. Based on this estimation series, the apparatus B calculates the receiving CNR (carrier to noise power ratio). Next, according to the calculated receiving CNR, the apparatus B creates a tonemap that specifies communication parameters such as a subcarrier to be used and a modulation method for each subcarrier. An example of the tonemap is shown in FIG. 6. Herein, the tonemap is constituted by the tonemap number for discriminating this tonemap from other tonemaps, the subcarrier number for identifying the subcarrier of interest in this tonemap, and information of use/non-use of the subcarrier and the modulation factor. The information on the modulation factor of the subcarrier may be information on the modulation type (16 QAM or 32 QAM, for example) or may be the number of bit allocation of the subcarrier ("4" in the case of 16 QAM, for example) shown in FIG. 6. Then, the apparatus B responds to the apparatus A by sending the transmission line estimation including the tonemap. It should be noted that the above-described multi-carrier transmission method is an example, and other methods such as a spread spectrum method also can be used. Furthermore, the information on the receiving CNR is used for determining the communication parameters but information other than this also can be used.

With a similar process, the apparatus A measures the characteristics of the transmission line in the other transmission line estimation sections (steps 5 to 10). In the example in FIG. 2, the characteristics of the transmission line are measured in a transmission line estimation section 1/3 (the half-tone portion 1 in the drawing) and a transmission line estimation section 3/3 (the half-tone portion 3 in the drawing). With this process, the apparatus A completes the transmission line estimation in all of these three divided transmission line estimation sections, that is, acquisition of the tonemaps (step 11). Then, among the plurality of acquired tonemaps, the apparatus A selects one tonemap that is optimal for use in the communications, and notifies the apparatus B of it (step 12). With this process, the apparatuses A and B can share the optimal tonemap. Hereinafter, the communications are performed using this optimal tonemap.

An optimal tonemap is selected, for example, in the following manner. In the example in FIG. 2, a noise is generated in the transmission line estimation sections 1/3 and 2/3, and a noise is not generated in the transmission line estimation section 3/3 (see FIG. 7 partially extracting and magnifying FIG. 2). Therefore, the tonemap of the transmission line estimation section 3/3 has the highest PHY rate. Accordingly, this tonemap with the highest PHY rate is selected as the tonemap used for the communications.

Even without acquiring all of the tonemaps of the transmission line estimation sections, it is possible to select an optimal tonemap among tonemaps that have been acquired when a predetermined time-out period has passed.

As described above, according to the communication apparatus 1 of the first embodiment of the present invention, it is possible to easily realize transmission line estimation in a distributed manner. Thus, the characteristics of the transmission line are estimated and evaluated with a high precision, and thus data can be sent and received at a high throughput.

In the first embodiment, the integers n and m are described as fixed values, but they can be changed dynamically in accordance with, for example, a change in the transmission line based on the estimation result of the transmission line, the value of the PHY rate, or the degree of a variation of the PHY rate.

Figure 8:
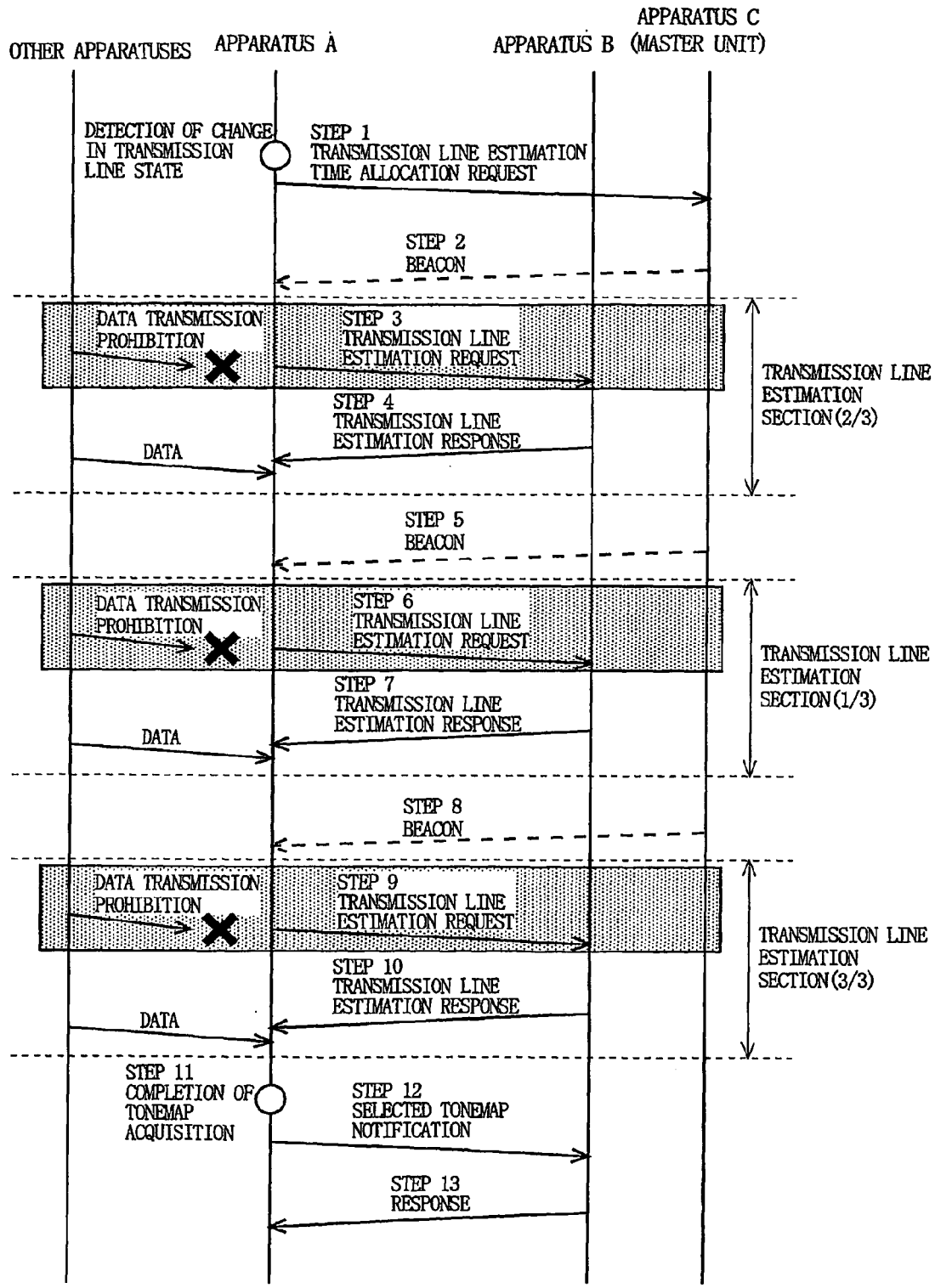
FIG. 8 is another communication sequence showing the procedure following which a transmission line is estimated by the communication apparatuses according to the first embodiment of the present invention.

Furthermore, in the communication sequence shown in FIG. 5, a relevant apparatus other than the apparatuses A, B, and C is not described, but the process is performed typically as shown in FIG. 8.

Referring to FIG. 8, information on time allocation for estimating the transmission line is added to a beacon sent from the apparatus c. The information on the time allocation for estimating the transmission line not only specifies, for the apparatus A, a time during which a request to estimate the transmission line can be sent to the apparatus B, but also prohibits the apparatuses B, C, and others from transferring data. By prohibiting apparatuses other than that sends the request from transmitting in a time during which the request to estimate the transmission line is sent (the half-tone period in FIG. 8), it is possible to avoid a collision, for example, between the request to estimate the transmission line and data.

In a time during which a response to the request to estimate the transmission line is sent from the apparatus B to the apparatus A, data transfer by the apparatuses A, B, and others may be or may not be prohibited for the purpose of improving the throughput in the data transfer. FIG. 8 is the communication sequence in which data transfer is not prohibited. Herein, when data transfer is not prohibited, it is preferable that the response from the apparatus B is given the highest priority.

Furthermore, instead of a manner in which the receiver apparatus B responds to the transmitter apparatus A by sending the transmission line estimation at each time as described above, the plurality of transmission line estimations may be sent at one time, or the receiver apparatus B may select a tonemap based on the plurality of transmission line estimations and notify the transmitter apparatus A of the selected tonemap. In either case, the effect of the present invention is not lost.

Second Embodiment

The first embodiment described above is a technique assuming that the variation cycle of the characteristics of the transmission line is known in advance. Then, in a second embodiment below, a technique will be described in which an optimal beacon period can be set automatically even when the variation cycle of the characteristics of the transmission line is not known in advance.

Figure 9:
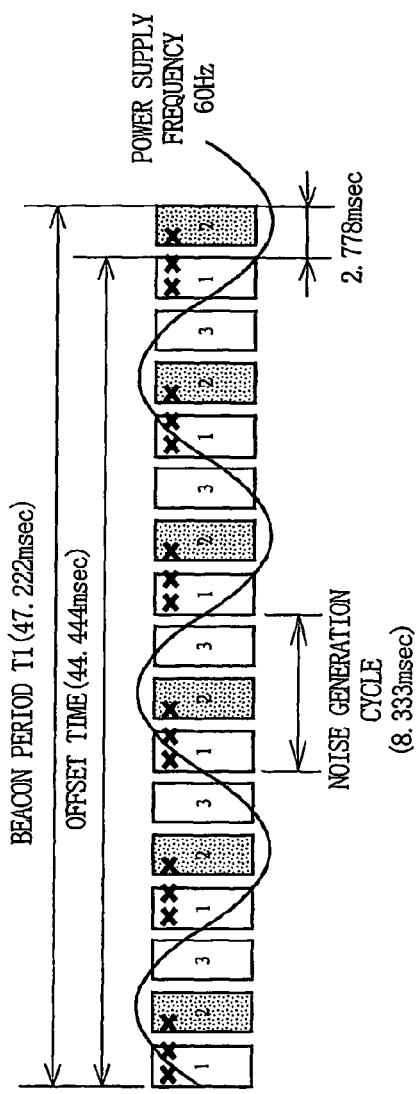
FIG. 9 is a diagram explaining a method by which a beacon period is determined by the communication apparatuses according to the first embodiment of the present invention.
Figure 10:
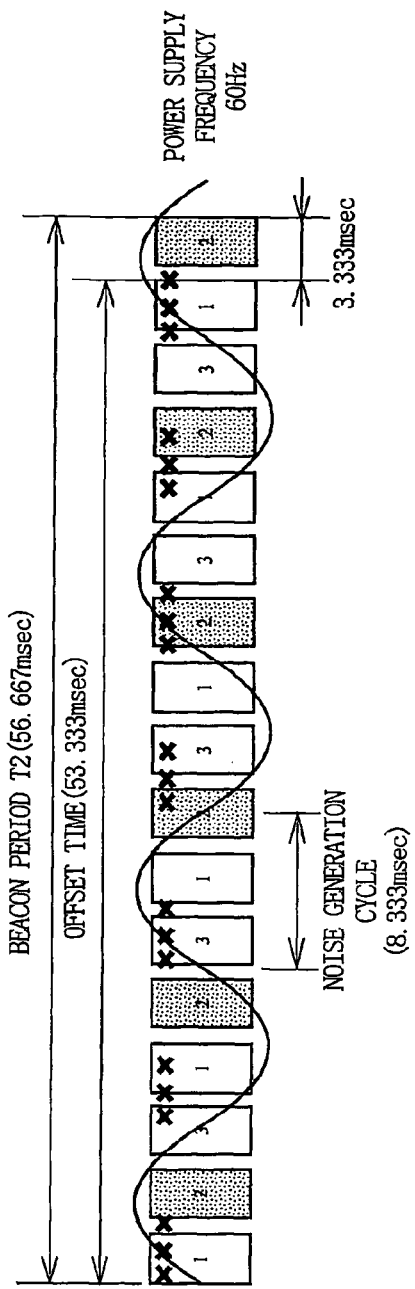
FIG. 10 is a diagram explaining a method by which a beacon period is determined by the communication apparatuses according to the first embodiment of the present invention.

For example, a case will be described in which the communication apparatus 1 can set both of a beacon period T1 (FIG. 9) when the variation cycle L of the characteristics of the transmission line, which is synchronized with a commercial power supply frequency of 60 Hz, is 8.333 msec and when the integers n=3 and m=17, and a beacon period T2 (FIG. 10) when the variation cycle L of the characteristics of the transmission line, which is synchronized with a commercial power supply frequency of 50 Hz, is 10 msec and when the variables n=3 and m=17. In this case, the communication apparatus 1 estimates the transmission line in all of the identical sections within a beacon period and acquires a plurality of tonemaps. FIGS. 9 and 10 show a case of the transmission line estimation section 2 (the half-tone portions in the drawings). The offset time is given based on "L×k/n" (k is a real number that satisfies 0≦k<m), and k=16 in FIGS. 9 and 10.

Herein, it is assumed that the actual commercial power supply frequency is 60 Hz.

As a result, the variation cycle L of the characteristics of the transmission line in the beacon period T1 is synchronized more with a noise that is synchronized with the actual commercial power supply frequency (60 Hz) in the drawing (FIG. 9). Thus, the characteristics of the transmission line at the transmission line estimation sections 2 are substantially the same, and a similar value for the communication parameter (PHY rate) of each tonemap can be obtained in the plurality of acquired tonemaps, so that it is determined that the correlation, regarding a noise, between the beacon period T1 and the variation cycle L is high.

On the other hand, the variation cycle L of the characteristics of the transmission line in the beacon period T2 is not synchronized with a noise that is synchronized with the actual commercial power supply frequency (60 Hz) in the drawing (FIG. 10). Thus, the characteristics of the transmission line at the transmission line estimation sections 2 are different from each other, and the communication parameter (PHY rate) of each tonemap is different for each of the plurality of acquired tonemaps. Therefore, it is determined that the correlation, regarding a noise, between the beacon period T2 and the variation cycle L is low.

Based on the above-described points, it is determined that the settings of a beacon period determined to have the highest correlation is synchronized most with a noise that is actually being generated. Accordingly, only by selecting the settings of the beacon period with which the correlation is high, it is possible to automatically set a beacon period that corresponds to the variation cycle of the characteristics of the transmission line.

An optimal communication parameter that is noise-resistant is selected by setting the beacon period according to the second embodiment and then by performing the process according to the first embodiment.

The above-described embodiments can be realized also when a CPU executes a program that can let the CPU execute the above-described procedure stored in a storage device (ROM, RAM, or hard disk, for example). In this case, the program may be executed after being stored in the storage device via a storage medium, or may be executed directly on the storage medium. The storage medium here includes a semiconductor memory such as a ROM, a RAM, and a flash memory, a magnetic disk memory such as a flexible disk and a hard disk, an optical disk such as a CD-ROM, a DVD, and a BD, and a memory card. Furthermore, the concept of the storage medium also includes a communication medium such as a telephone line and a carrier line.

Each of the functional blocks indicated by the broken line in FIG. 1 may be realized by an LSI, which is an integrated circuit. Each of the functional blocks may be formed on a single chip one by one, or a part or all of them may be formed on one chip. Although an LSI is used in these embodiments, this circuit may be called IC, system LSI, super LSI, or ultra LSI, depending on the difference of the degree of integration.

It should be noted that the method for forming an integrated circuit is not limited to using an LSI, and a circuit integration maybe realized by a dedicated circuit or a general purpose processor Furthermore, it is possible to use an FPGA (field programmable gate array) that can be programmed after an LSI is produced, and a reconfigurable processor being capable of reconfiguring connections and settings of circuit cells inside of the LSI.

Moreover, if circuit integration technology that replaces an LSI appears due to the development of semiconductor technology or derived another technology, it is natural that the functional blocks may be integrated by using that technology. There is a possibility of, for example, application of biotechnology.

Figure 11:
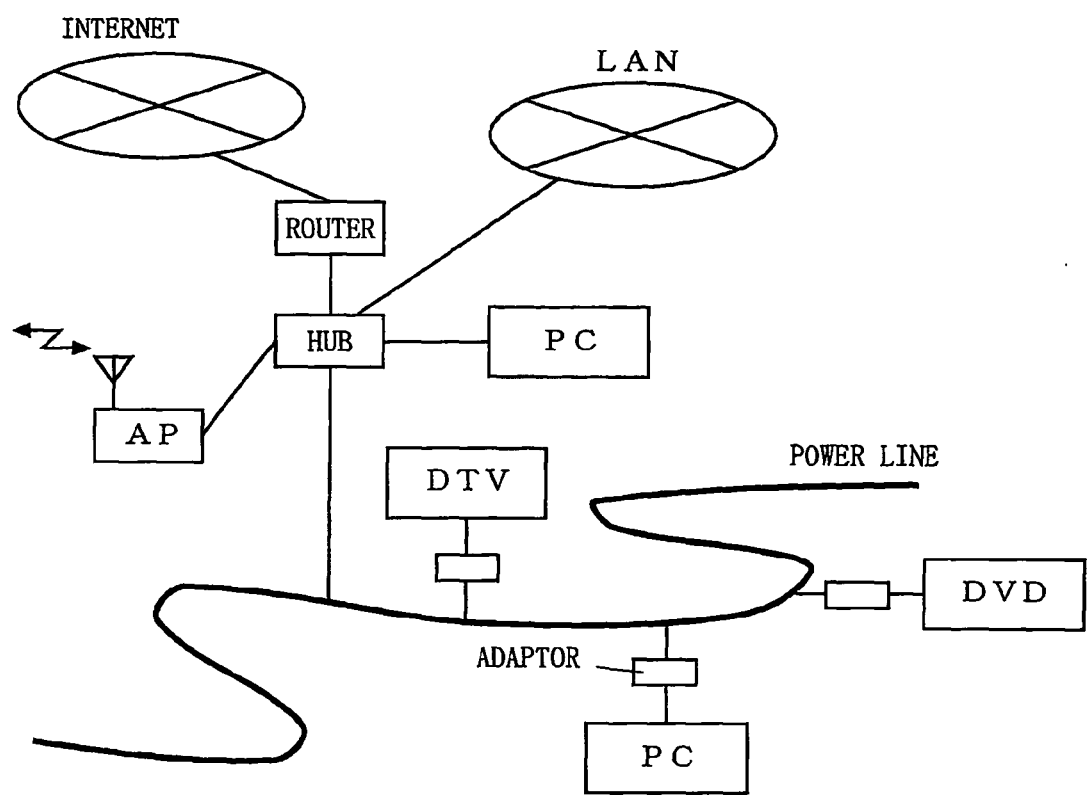
FIG. 11 is a diagram showing an example of a communication network system in which the communication apparatuses of the present invention are applied to high-speed power line transmission.
Figure 12:
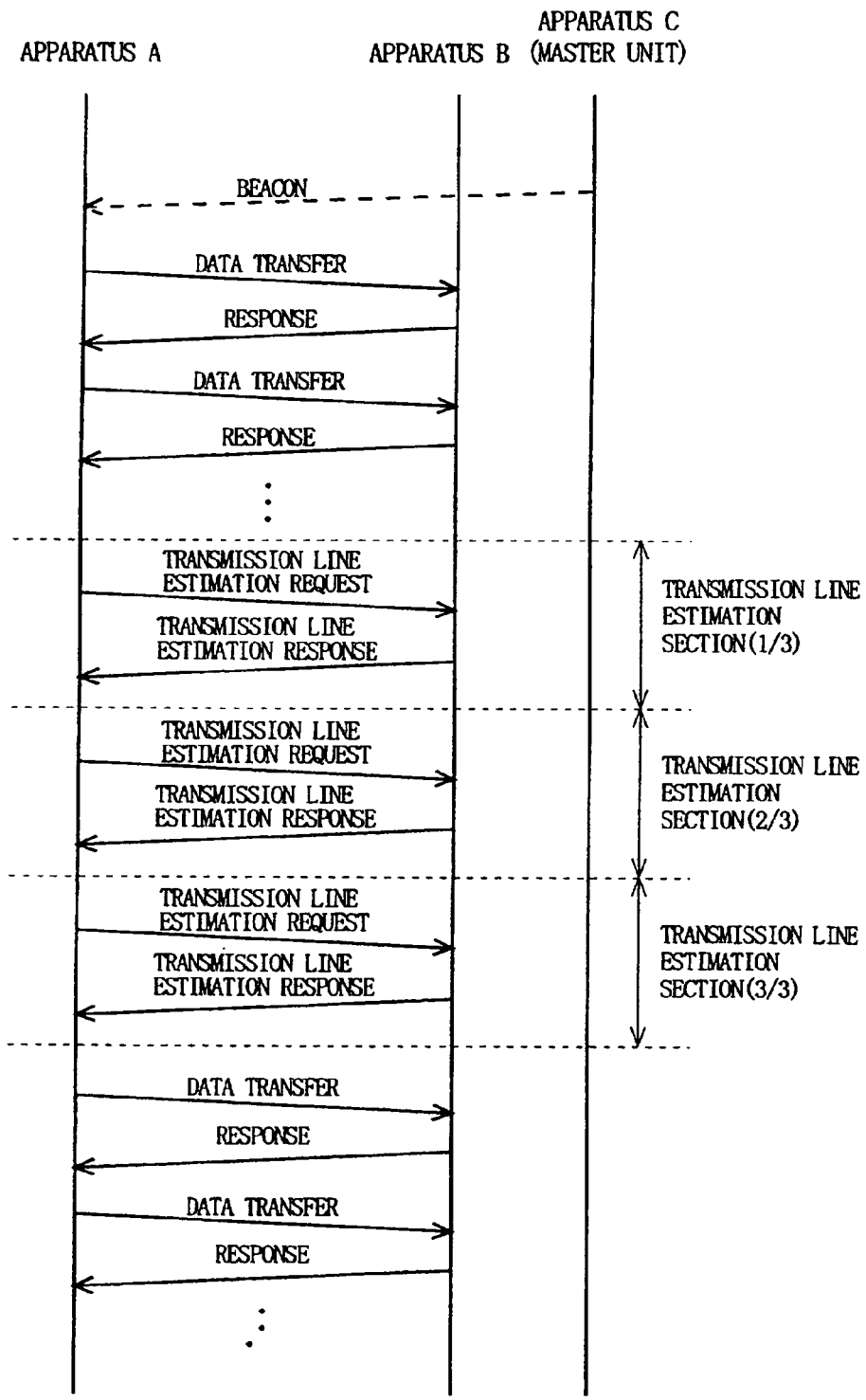
FIG. 12 is a communication sequence showing the procedure following which a transmission line is estimated by a conventional communication apparatus.

Hereinafter, an example will be described in which the present invention that has been described in the embodiments is applied to an actual network system. FIG. 11 is a diagram showing an example of a network system in which the present invention is applied to high-speed power line transmission. In FIG. 11, an IEEE1394 interface, a USB interface, or so forth provided in multimedia equipment such as a personal computer, a DVD recorder, a digital TV, and a home server system is connected to a power line via an adaptor provided with the function of the present invention. With this configuration, it is possible to construct a network system in which digital data such as multimedia data can be transmitted at a high speed via a power line serving as a medium. In contrast to a conventional wired LAN, this system does not require a network cable to be newly installed and can use a power line having been installed already at home, office, or so forth without any process as a network line, so that a significant convenience in terms of cost and simplicity of installation is provided.

The above-described embodiment is an example in which existing multimedia equipment is applied to power line communications via an adaptor converting a signal interface of the existing equipment to an interface of the power line communications. In future, however, the function of the present invention is included in multimedia equipment, so that it becomes possible to transmit data between the equipment via power codes of the multimedia equipment. In this case there is no need for the adaptor, the IEEE1394 cable, or the USB cable shown in FIG. 11, and thus wiring is simplified. Furthermore, since connection to the Internet via a router or connection to a wireless/wired LAN using, for example, a hub is possible, so that it is possible to expand a LAN system using the high-speed power line transmission system of the present invention. Furthermore, in the power line transmission method, communication data runs via a power line. Therefore, in contrast to a wireless LAN, there is no problem that radio waves are intercepted, resulting in data leakage. The power line transmission method also has a security effect to protect data. Data running on the power line can be protected by IPsec in IP protocol, encoding the contents themselves, or other DRM methods, for example.

As described above, by installing a QoS function including a copyright protection function by encoding the contents and the effect of the present invention (band allocation flexibly addressing improvement in throughput, increased retransmission, and variation in traffic), AV contents with a high quality can be transmitted via a power line.

INDUSTRIAL APPLICABILITY

The communication apparatus and the transmission line estimation method of the present invention can be used, for example, in a communication system in which the characteristics of a transmission line vary at a certain cycle, and are particularly useful, for example, when the characteristics of the transmission line are required to be estimated and evaluated with a high precis ion so that data is sent and received at a high throughput.

The invention claimed is:

1. A communication apparatus performing periodic communications with another communication apparatus via a transmission line, comprising:
 a communication control portion operable to set a communication period to L×m/n to perform communications, wherein L is a variation cycle of characteristics of a transmission line, n is an integer that is 2 or larger, and m is an integer that is greater than or equal to n and whose greatest common measure with n is 1,
 a transmission line estimation portion operable to estimate the characteristics of the transmission line within a time L/n after a certain offset time has passed since the communication period started, and
 a communication parameter determination portion operable to determine a communication parameter to be used by the communication control portion, based on a result of estimation by the transmission line estimation portion.

2. The communication apparatus according to claim 1, wherein the offset time is L×k/n, and k is a real number that satisfies $0 \leq k < m$.

3. The communication apparatus according to claim 1, wherein the transmission line estimation portion estimates the characteristics of the transmission line at least n times.

4. The communication apparatus according to claim 1, wherein the transmission line estimation portion estimates the characteristics of the transmission line at an initial starting up of the communication apparatus or upon a detection of a change in a state of the transmission line.

5. The communication apparatus according to claim 1, wherein the communication period is a period of beacons sent from a communication apparatus serving as a master unit.

6. The communication apparatus according to claim 5, wherein the communication control portion is operable to send a request to allocate a time for estimating the characteristics of the transmission line to the communication apparatus serving as the master unit.

7. The communication apparatus according to claim 6, wherein the communication control portion is operable to notify another communication apparatus of an allocation of a time for estimating the characteristics of the transmission line using a beacon frame or a polling frame, and the transmission line estimation portion is operable to estimate the characteristics of the transmission line only when permission is given.

8. The communication apparatus according to claim 1, wherein the variation cycle L of the characteristics of the transmission line is a half cycle of a commercial power supply cycle.

9. A transmission line estimation method executed by a communication apparatus performing periodic communications with another communication apparatus via a transmission line, comprising:
 setting a communication period to L×m/n to perform communications, wherein L is a variation cycle of characteristics of a transmission line, n is an integer that is 2 or larger, and m is an integer that is greater than or equal to n and whose greatest common measure with n is 1,
 estimating the characteristics of the transmission line within a time L/n after a certain offset time has passed since the communication period started, and
 determining a communication parameter to be used in the communications, based on a result of said estimating.

10. An integrated circuit used for a communication apparatus performing periodic communications with another communication apparatus via a transmission line, wherein circuits are integrated that function as:
 a communication control portion operable to set a communication period to L×m/n to perform communications, wherein L is a variation cycle of characteristics of a transmission line, n is an integer that is 2 or larger, and m is an integer that is greater than or equal to n and whose greatest common measure with n is 1, a transmission line estimation portion operable to estimate the characteristics of the transmission line within a time L/n after a certain offset time has passed since the communication period started, and a communication parameter determination portion operable to determine a communication parameter to be used by the communication control portion, based on a result of estimation by the transmission line estimation portion.

11. A beacon period determination method executed by a communication apparatus performing periodical communications with another communication apparatus via a transmission line, comprising:

determining an offset time based on one section among a plurality of sections which is obtained by dividing a variation cycle, and setting a beacon period that is synchronized with a power supply cycle, based on the offset time.

12. The beacon period determination method according to claim 11, further comprising estimating, based on the offset time, characteristics of the transmission line that is synchronized with the power supply cycle.

13. The beacon period determination method according to claim 11, further comprising:

estimating, based on the offset time, characteristics of the transmission line;

determining a correlation, regarding a noise, between the beacon period and the variation cycle, based on a tonemap obtained from a result of estimation in the estimating step; and setting a beacon period that is determined to have high correlation.

* * * * *